April 2, 1963  E. C. PETERSON  3,083,603
FIGURE EIGHT SHEAR

Filed Feb. 26, 1958  6 Sheets-Sheet 1

INVENTOR
EDWARD C. PETERSON
BY
ATTORNEYS

April 2, 1963 E. C. PETERSON 3,083,603
FIGURE EIGHT SHEAR
Filed Feb. 26, 1958 6 Sheets-Sheet 2
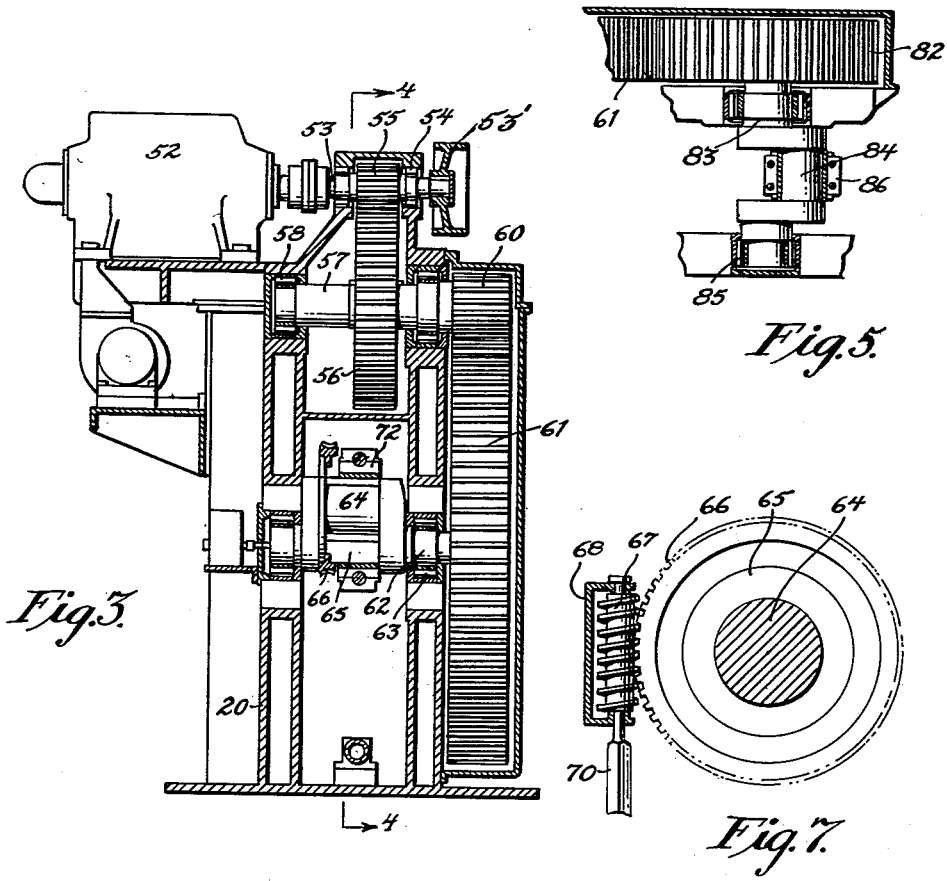
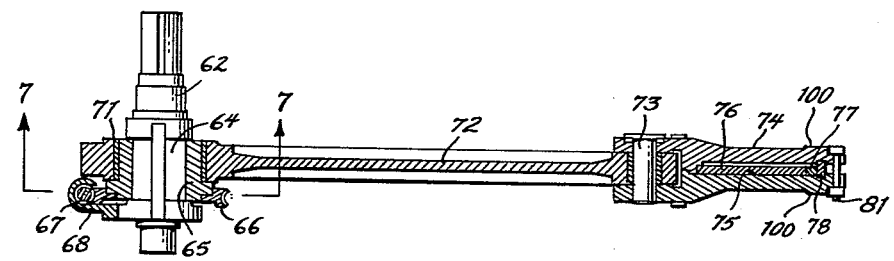
INVENTOR
EDWARD C. PETERSON
BY
ATTORNEYS April 2, 1963
E. C. PETERSON
3,083,603
FIGURE EIGHT SHEAR
Filed Feb. 26, 1958
6 Sheets-Sheet 3
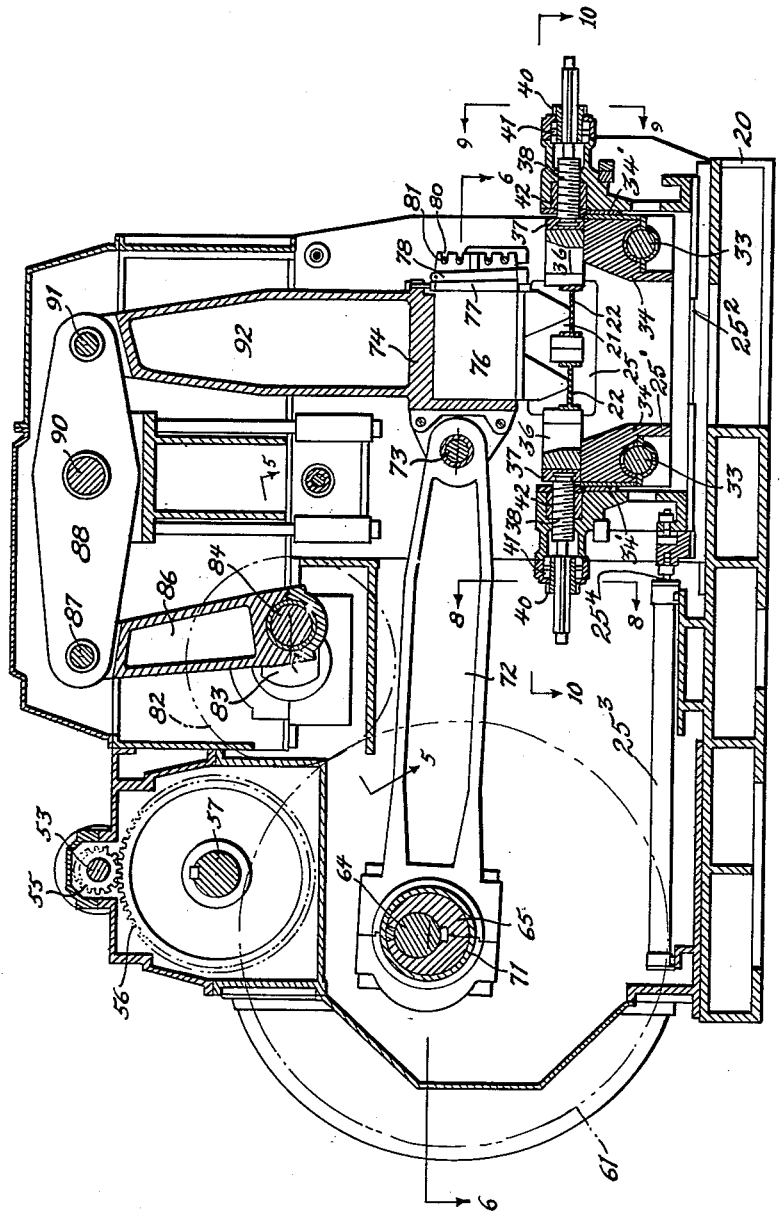
Fig. 4.
INVENTOR
EDWARD C. PETERSON
BY
ATTORNEYS April 2, 1963   E. C. PETERSON   3,083,603
FIGURE EIGHT SHEAR
Filed Feb. 26, 1958   6 Sheets-Sheet 4

INVENTOR
EDWARD C. PETERSON
BY
ATTORNEYS

April 2, 1963  E. C. PETERSON  3,083,603
FIGURE EIGHT SHEAR
Filed Feb. 26, 1958  6 Sheets-Sheet 5
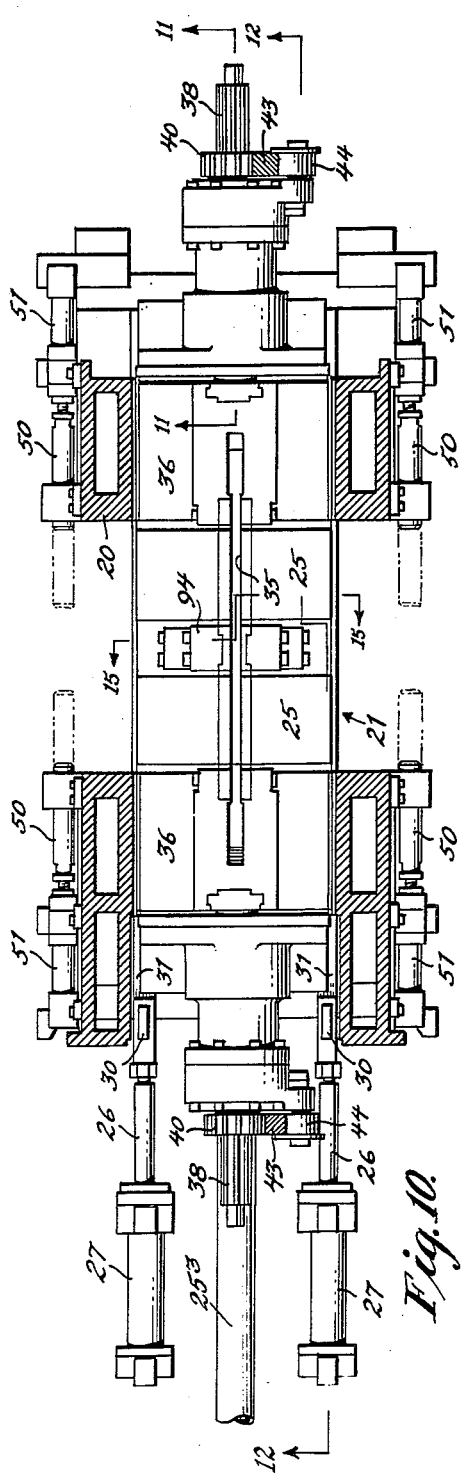
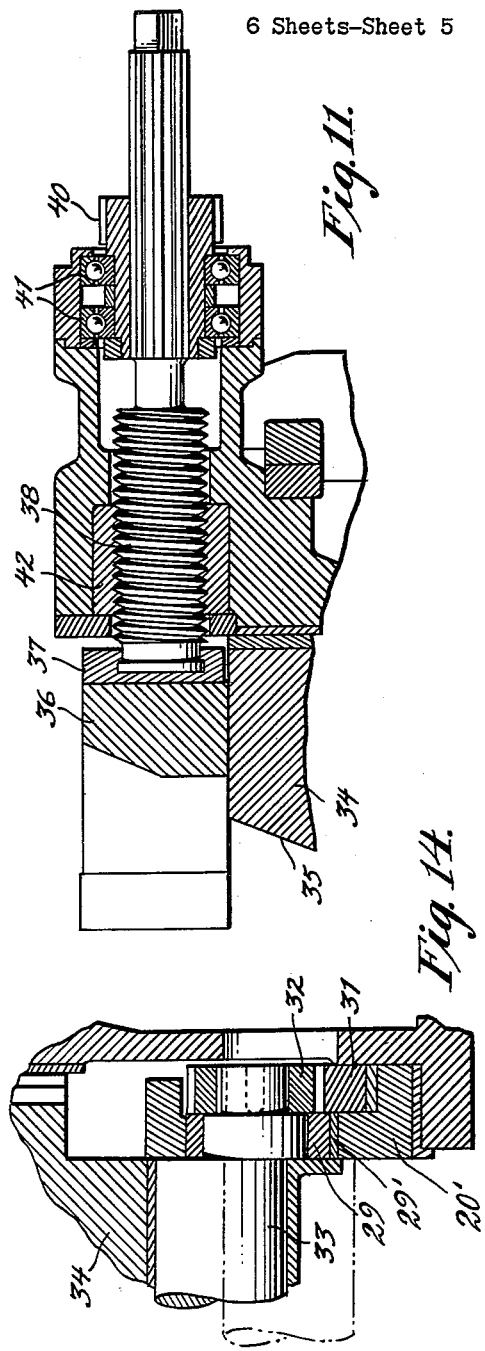
INVENTOR
EDWARD C. PETERSON
BY
ATTORNEYS April 2, 1963 E. C. PETERSON 3,083,603
FIGURE EIGHT SHEAR
Filed Feb. 26, 1958 6 Sheets-Sheet 6
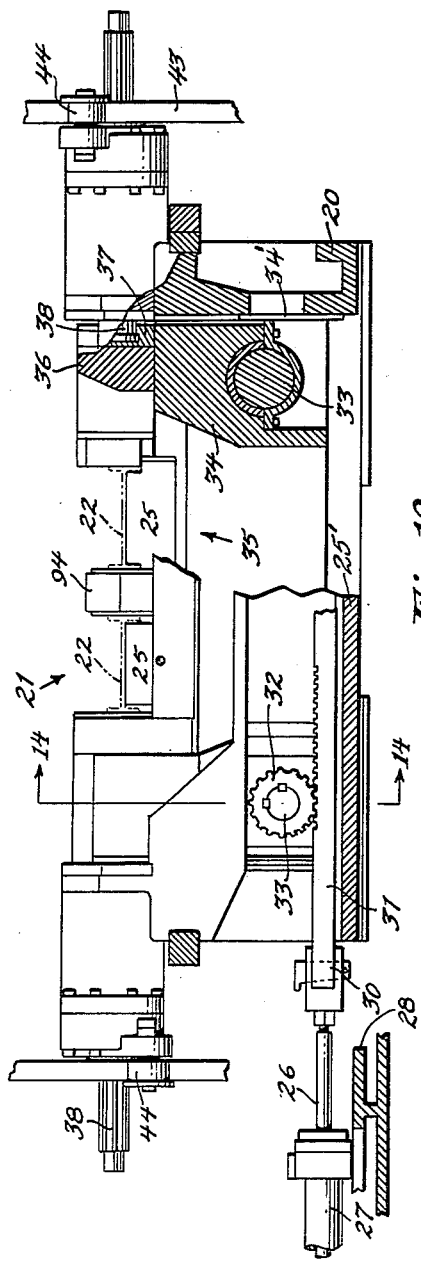
*Fig.12.*
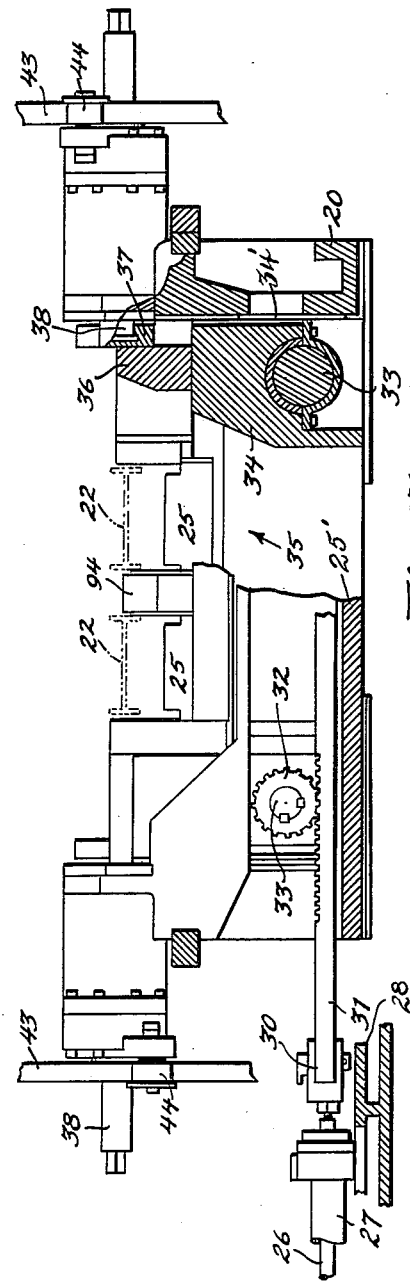
*Fig.13.*
INVENTOR
EDWARD C. PETERSON
BY
ATTORNEYS

United States Patent Office 3,083,603
Patented Apr. 2, 1963

3,083,603
FIGURE EIGHT SHEAR
Edward C. Peterson, Douglasville, Pa., assignor to Birdsboro Corporation, a corporation of Pennsylvania
Filed Feb. 26, 1958, Ser. No. 717,751
4 Claims. (Cl. 83—530)

The present invention relates to figure eight shears of the type used in metal rolling mills and fabricating plants for shearing steel and other metals.

A purpose of the invention is to obtain a more simple convenient, reliable and trouble free drive for a figure eight shear.

A further purpose is to obtain the relative movement of the shear blade or blades toward and away from the work by a crank driving a connecting rod to a pitman, which in turn operates a crosshead supporting the shear blade or blades.

A further purpose is to drive the shear blade or blades of a figure eight shear by a shear drive which operatively connects to a first crank which manipulates a connecting rod connected to a crosshead holding the shear blade or blades, the shear drive also driving a second crank which connects by a connecting rod through a pitman to the crosshead.

A further purpose is to adjust the throw of the first crank to determine the path of the shear blade motion.

A further purpose is to raise and lower work clamping elements in unison desirably by a crank operated by means of a rack and pinion.

A further purpose is to move the die blocks laterally out from under the shear blade by sliding the entire die block assembly on a track.

A further purpose is to provide two shear blades operating in unison which simultaneously cut two different work pieces.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

FIGURE 3 is a vertical section of FIGURE 1 on the line 3—3.

FIGURE 4 is a vertical section of FIGURE 3 on the line 4—4.

FIGURE 5 is a detail generally horizontal section of FIGURE 4 on the line 5—5.

FIGURE 6 is a generally horizontal section of FIGURE 4 on the line 6—6.

FIGURE 7 is a detail vertical section of FIGURE 6 on the line 7—7.

FIGURE 10 is a horizontal section of FIGURE 4 on the line 10—10.

FIGURE 11 is an enlarged vertical section of FIGURE 10 on the line 11—11 showing the clamp base block raised.

FIGURE 12 is a vertical jump section of FIGURE 10, on the line 12—12, with the clamp base blocks raised.

FIGURE 13 is a view similar to FIGURE 12 showing the clamp base blocks lowered.

FIGURE 14 is a fragmentary vertical section of FIGURE 12 on the line 14—14.

Figure 1:
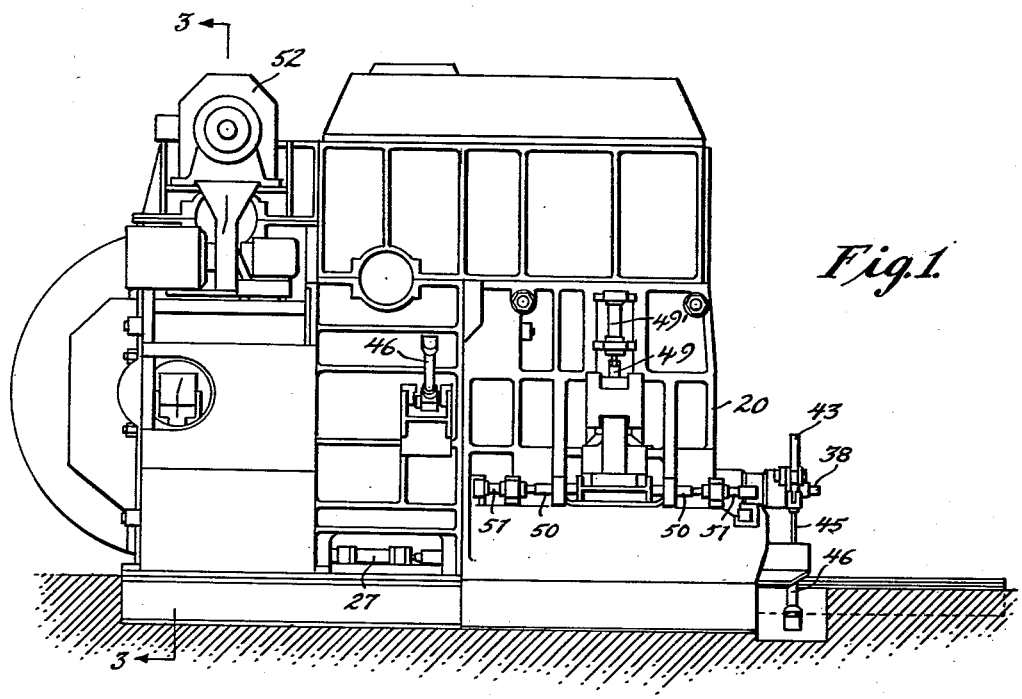
FIGURE 1 is a side elevation of a figure eight shear of the present invention.

Describing in illustration but not in limitation and referring to the drawings:

The shear of the present invention is a universal beam shear for cutting cold structural beams up to and including large sizes, for example of the order of 24 inches web. While the invention is illustrated as applied to I-beams and H-beams, it is also applicable to other shapes such as channels, T's and angles, by simply modifying the die blocks for positioning and retaining the work material.

The present shear is of the character which describes an approximate figure eight about the web and flanges of a beam. Considering an I-beam, the shear blade or knife starts to cut by puncturing the center of the web and pierces downward and then upward, making one-half the figure eight and cutting one-half of the web and one flange. The cycle then continues, cutting the remaining portion of the web and the other flange and thus completing the figure eight.

FIGURE eight shears are well known in the art, as for example in the Pels shear. These prior art devices, however, are subject to difficulty because the mechanism for obtaining the motion is complicated, expensive, high in maintenance and subject to service difficulties.

By the present invention, a less expensive and more reliable and sturdy driving mechanism is employed, consisting of a common drive which transmits horizontal motion to the crosshead holding the shear blade by a crank and connecting rod and which transmits vertical motion to the crosshead by a connecting rod and pitman, which in turn connects to the crosshead.

The size of the figure eight is adjusted by changing the throw or eccentricity of the first crank.

The device of the invention also lends itself to using a single knife or shear blade to cut a single beam and also to using double knife or shear blade to cut two smaller beams.

One of the important features of the invention is that the work clamps retract out of the way of the work, but are raised in unison when the work reaches the shear position, as for example by a rack and pinions connected to cranks.

When the work is ready to cut, side clamping blocks are brought into position suitably to engage the flanges of the beam.

The die block assembly is moved to an accessible position for die changing.

Figure 2:
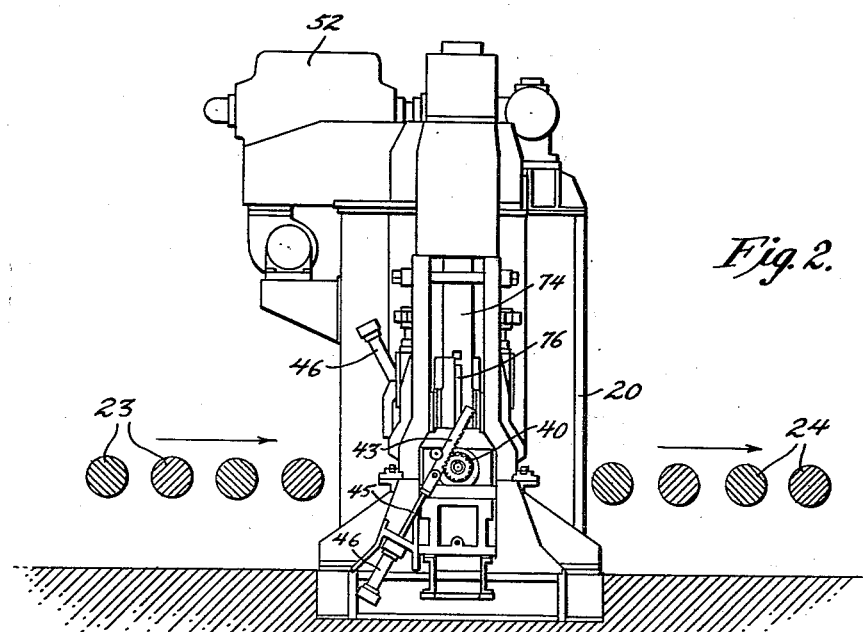
FIGURE 2 is a diagrammatic front elevation of the shear of FIGURE 1.
Figure 8:
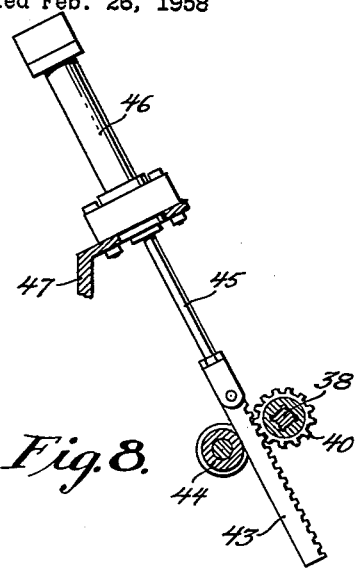
FIGURE 8 is a fragmentary section of FIGURE 4 on the line 8—8.

Considering now the drawings in detail, the shear of the invention comprises a frame 20 which has a transverse opening or openings 21 to receive work pieces, suitable bars 22 which are progressed to and from the shear by approach rolls 23 (FIGURE 2) and run-off rolls 24.

The work when in shearing position rests on die blocks 25 resting on a die frame 25' which slides on ways $25^2$ and is moved back and forth to align the dies or to gain access for die changing by a fluid cylinder $25^3$ on the main frame having a piston and rod combination $25^4$ connected to the die frame 25'. The die blocks are provided with suitable recesses to fit the contour of the work.

While the work is being adjusted to shearing position, the lower clamping parts, including the die blocks 25, are retracted below the level of the work as shown in FIG- URE 13 by piston and piston rod combinations 26 (FIGURES 12 and 13) in cylinders 27, mounted on the frame at 28 and interconnecting at 30 with racks 31 extending horizontally and suitably guided in the frame and intergeared at each side of the machine with pinions 32 keyed on crank shafts 33 journaled in bearing blocks 29 which slide horizontally on guides 29' in frame portions 20', and having their cranks journaled in opposite ends of die supporting blocks 34. The die supporting blocks 34 are guided for vertical movement in the frame at 34'. The die supporting blocks and the dies themselves are slotted at 35, best seen in FIGURE 10, to allow for over-travel of the shear blade.

Resting on and carried up and down with the die supporting block 34, at each side of the work, are clamping jaws 36 which are also slotted in line with the slot 35 for over-travel of the shear blade. Each of the clamping jaws 36 in raised position, as best seen in FIGURES 11 and 12, is engaged on the side opposite from the work by a screw head 37 which is rotatably connected to screw 38 splined to pinion 40, which is journaled in bearings 41 in a suitable housing on the die frame. The screws 38 are threaded in nuts 42 held in such housings.

Figure 9:
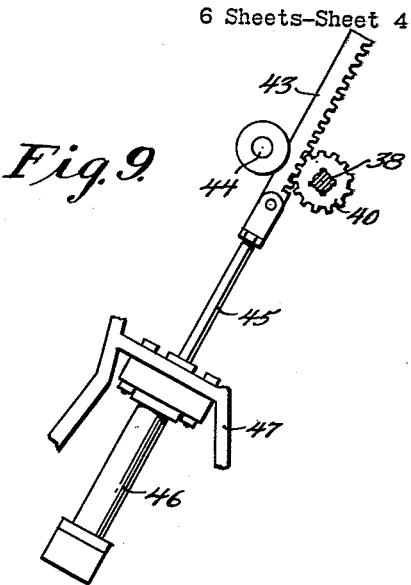
FIGURE 9 is a fragmentary section of FIGURE 4 on the line 9—9.

As best seen in FIGURES 9 and 10, the pinions 40 are actuated by racks 43 guided by rollers 44 journaled on the die housings, and energized by piston and rod combinations 45 reciprocated back and forth by fluid operated cylinders 46 supported on the frame at 47.

The work is held down by rams 49 acting in cylinders 49' at the sides of the machine (FIGURE 1).

At opposite ends of the die block auxiliary side clamps 50 are provided at each side of the work, actuated by fluid operated cylinders 51 supported on the frame and having suitable pistons and piston rods, the clamps suitably engaging the flanges of the bars.

The drive of the shear is accomplished by a motor 52 (FIGURES 1 and 2) which turns a main drive shaft 53 on suitable bearings 54 having keyed thereon a drive pinion 55, best seen in FIGURES 3 and 4. The shaft 53 also carries a brake illustrated diagrammatically by brake drum 53', which is released when the shear operates and sets at the end of each cycle. The pinion 55 drives a gear 56 keyed on shaft 57, journaled on bearings 58, and having keyed thereon a pinion 60 which meshes with a bull gear 61 keyed on eccentric shaft 62 journaled on bearings 63 on the frame.

The eccentric shaft 62 carries thereon a crank 64 which is surrounded by a split eccentric 65 (FIGURE 4) which carries thereon and is keyed to an adjustment worm gear 66 best seen in FIGURE 7, which continuously meshes with a worm 67 suitably journaled and supported on a bracket 68 mounted on the crank 64 (FIGURE 6) and adjusted by a wrench head 70 on the shaft while holding the eccentric by any suitable lock bar inserted in an eccentric recess longitudinal of the axis and in a recess in the housing.

The eccentric 65 is surrounded by an eccentric bearing 71 which journals one end of connetcing rod 72, the opposite end of which pivotally connects at 73 with a shear-blade-supporting cross head 74.

As best seen in FIGURE 6, the cross head 74 has a recess 75 which receives the shear blade 76, the recess being open at one side to permit the entry of side supporting bar 77 and side locking wedge 78. The two sides of the crosshead are slotted at 80 to receive shear blade locking bolts 81. The shear blade is suitably locked in place by keys 82 (FIGURE 15).

The bull gear 61 also meshes with gear 82 keyed on crank shaft 83 journaled in the frame at 85 and having crank 84, best seen in FIGURES 4 and 5. The ratios of the gears are selected so that the knife blade makes two vertical strokes to each horizontal stroke. Thus the crank 84 makes two revolutions for every revolution of the crank 64.

The crank pivotally connects to one end of connecting rod 86, the opposite end of which pivotally connects at 87 to one end of pitman 88. The middle of the pitman is pivoted on shaft 90 extending across and journaled in the frame. The opposite end of the pitman is pivotally connected at 91 to an upper extension 92 on crosshead 74.

Figures 15, 16, 17:
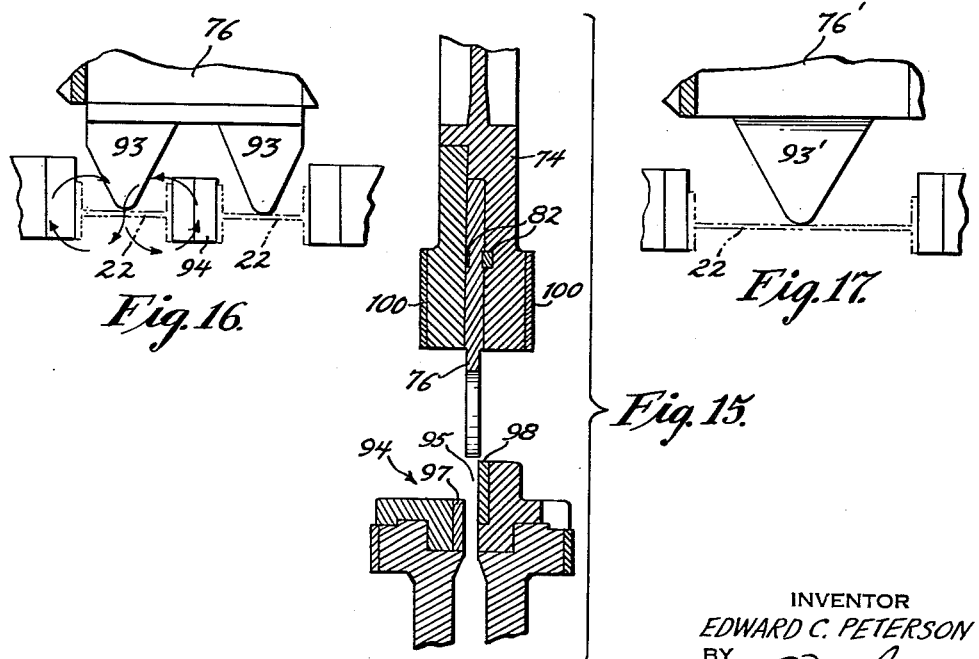
FIGURE 15 is an enlarged fragmentary vertical jump section of FIGURE 10 on the line 15—15.
FIGURE 16 is a diagram generally in vertical transverse section with respect to the work, showing the path of the shear blade when cutting two pieces of work simultaneously.
FIGURE 17 is a view similar to FIGURE 16 showing the relation of the shear blade to the work when cutting a single piece of work.

In some cases the shear blade 76 is divided and carries two separated triangular blade portions 93 as shown in FIGURES 4, 12, 13 and 16, each of which describes a figure eight in cutting separate bars 22. In this case a work separator and shear blade guide 94 is provided between the two bars as best seen in FIGURES 15 and 16, the work separator and guide 94 being slotted at 95 in line with the shear blade slot 35 in the die blocks and having cooperating guide surfaces 97 and 98 for the blade.

In addition, the crosshead 74 has lateral guiding surfaces 100 which suitably engage cooperating vertical guiding surfaces on the frame.

In case a single large beam is to be cut as shown in FIGURE 17, the shear blade 76' is provided with a single triangular blade portion 93' which cuts the work.

In operation of the device of the invention with the die blocks retracted in the position of FIGURE 13, and the shear blade raised and inactive, the work bar or bars are pushed through the space 21 until the proper position for shearing is reached. The fluid operated cylinders 27 are energized, causing racks 31 to advance and turn pinions 32 which move cranks 33 to their upper limiting position and raise die base block 34, thus raising die jaws 36 to the position in FIGURE 12. The fluid operated cylinders 46 are then energized to advance the clamping screws 38 and bring the clamping blocks 36 into engagement against the side flanges of the work. Also, the fluid operated cylinders 51 are energized to advance the auxiliary clamps 50 and clamp the side flanges of the work. The work is now clamped in proper position for cutting.

The brake 53' is released in any suitable manner. The motor drive of the shear is then started, and it causes pinion 55 to drive gear 56, which drives pinion 60 and bull gear 61. The bull gear turns the crank 64 and eccentric 65 which have of course been preliminarily set to the proper position by worm 67. This causes connecting rod 72 to move the crosshead 74 horizontally as required to produce the figure eight shearing motion. At the same time bull gear 61 drives gear 82 which turns crank 84 and moves connecting rod 86 to swing pitman 88 and manipulate crosshead 74 vertically.

The combined effect produces the figure eight motion as described. At the end of the cycle the brake again sets.

During the movement the crosshead is laterally guided both by the crosshead guides, and also during part of the stroke by the shear blade guides.

For proper alignment with the shear blade or to change dies, the die block is moved laterally by fluid cylinder $25^3$, on ways $25^2$.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claim.

Having thus described my invention what I claim as new and desire to secure by Letters Patent is:

1. A figure eight shear including a shear blade, a die cooperating with the shear blade and a shear drive, in combination with a vertically and horizontally moving crosshead holding the shear blade, lateral guide means effective both vertically and horizontally for guiding the crosshead in motion which is inclined both to the horizontal and to the vertical, a first crank horizontally displaced from the shear blade and operatively connected to the shear drive, a first connecting rod operatively connected between the first crank and the crosshead and controlling the horizontal component of the inclined motion of the crosshead, a second crank positioned out of the line of motion of the first connecting rod and operatively connected with the shear drive, a pitman pivotally mounted above the crosshead, a second connecting rod operatively connected from the pitman to the second crank, means operatively connected from the pitman to the crosshead to control the vertical component of the inclined motion of the crosshead, and means for rotating the cranks at different speeds.

2. A figure eight shear of claim 1, in which the second crank turns through two rotations for every rotation of the first crank.

3. A figure eight shear of claim 1, in combination with eccentric means for adjusting the throw of the first crank.

4. A figure eight shear of claim 3, in combination with an adjustment eccentric surrounding the first crank and operatively connected from the first crank to the first connecting rod, and means for adjusting the angular relation of the adjustment eccentric to the first crank.

References Cited in the file of this patent

UNITED STATES PATENTS

| | | |
|---|---|---|
| 167,213 | Bellinger | Aug. 31, 1875 |
| 516,737 | Hammond | Mar. 20, 1894 |
| 531,946 | Ireland | Jan. 1, 1895 |
| 532,988 | Pfouts | Jan. 22, 1895 |
| 692,379 | Stone | Feb. 4, 1902 |
| 1,241,255 | Hawthorne | Sept. 25, 1917 |
| 1,589,657 | Pels | June 22, 1926 |
| 2,328,466 | Krzenciessa | Aug. 31, 1943 |
| 2,347,808 | Brehm | May 2, 1944 |
| 2,386,706 | Moessinger | Oct. 9, 1945 |
| 2,547,168 | Nill | Apr. 3, 1951 |
| 2,613,739 | Lefere | Oct. 14, 1952 |
| 2,660,738 | Hieber | Dec. 1, 1953 |